(12) United States Patent
Gotou et al.

(10) Patent No.: US 6,296,593 B1
(45) Date of Patent: Oct. 2, 2001

(54) ELECTROMAGNETIC CLUTCH CONTROL DEVICE AND CONTROL METHOD FOR HYBRID DRIVE VEHICLE

(75) Inventors: Yuuji Gotou, Yokohama; Noboru Hattori, Yokosuka, both of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/422,853

(22) Filed: Oct. 25, 1999

(30) Foreign Application Priority Data

Nov. 4, 1998 (JP) .................................................. 10-313361

(51) Int. Cl.⁷ .................................................. B60K 41/02
(52) U.S. Cl. .................................................. 477/176; 477/5
(58) Field of Search .................................................. 477/176, 175, 477/5, 179, 180

(56) References Cited

U.S. PATENT DOCUMENTS

| | | | |
|---|---|---|---|
| 4,679,674 | * 7/1987 | Sakakiyama | 477/39 |
| 5,547,438 | * 8/1996 | Nozaki et al. | 477/175 |
| 5,562,571 | * 10/1996 | Maruyama et al. | 477/175 X |
| 5,733,223 | * 3/1998 | Matsubara et al. | 477/175 |
| 5,807,209 | * 9/1998 | Matsubara et al. | 477/176 |
| 5,816,979 | * 10/1998 | Shiiba et al. | 477/176 |
| 5,826,671 | * 10/1998 | Nakae et al. | 180/85.2 |
| 5,916,061 | * 6/1999 | Koyama et al. | 477/175 |
| 5,989,156 | * 11/1999 | Matsubara et al. | 477/176 X |
| 5,993,351 | * 11/1999 | Deguchi et al. | 477/5 |
| 6,019,183 | * 2/2000 | Shimasaki et al. | 180/165 |
| 6,053,842 | * 4/2000 | Kitda et al. | 477/5 |
| 6,083,139 | * 7/2000 | Deguchi et la. | 477/5 |

OTHER PUBLICATIONS

Toyota Motor Corporation, "Toyota Hybrid System", Press Information, see pp. 4–9,1997.*

Tetsundo Nihon Sha, "Automobile Engineering", vol. 46, No. 7, pp. 39–52, Jun. 1997.

* cited by examiner

Primary Examiner—Rodney H. Bonck
Assistant Examiner—Roger Pang
(74) Attorney, Agent, or Firm—Foley & Lardner

(57) ABSTRACT

A generator (4) is combined with drive wheels (8) of a vehicle, and the output of an engine (2) is transmitted to the drive wheels (8) under an engaging force of an electromagnetic clutch (3) in response to an energizing current. During a predetermined deceleration state, a braking force is applied to the drive wheels (8) and a battery (15) is charged by the generator (4) which performs regenerative power generation. At this time, the controller (16) supplies a weak energizing current to the electromagnetic clutch (3) so as to put the clutch (3) into a partially engaged state. A sensor (29) detects the output rotation speed of the clutch (3). When the output rotation speed of the clutch (3) is high, the controller (16) decreases the energizing current so that the rotational resistance of the electromagnetic clutch (3) is reduced. When the output rotation speed of the clutch (3) is low, the controller (16) increases the energizing current so that the re-engaging response of the electromagnetic clutch (3) is increased.

6 Claims, 5 Drawing Sheets

ELECTROMAGNETIC CLUTCH CONTROL DEVICE AND CONTROL METHOD FOR HYBRID DRIVE VEHICLE

FIELD OF THE INVENTION

This invention relates to control of an electromagnetic clutch of a hybrid drive vehicle which performs regenerative braking using a generator.

BACKGROUND OF THE INVENTION

A parallel hybrid drive vehicle which runs under the drive force of a motor or an engine, or both, is disclosed in pp. 39–52 of "Automobile Engineering", Vol. 46, No. 7 published in June, 1997 in Japan by Tetsudo Nihon Sha.

In this hybrid drive vehicle, when the load is small, the vehicle runs on the output of the motor alone, and when the load increases, the vehicle starts the engine to provide sufficient drive force.

On the other hand, during deceleration, so-called regenerative braking is performed wherein the motor is driven as a generator by the rotational energy of the drive wheels, and the power generated is used to charge a battery.

SUMMARY OF THE INVENTION

In order to increase power generation efficiency in regenerative braking, it is desirable to disengage the clutch which connects the drive wheels and the engine, and use all the deceleration force for power generation.

However, if the clutch is disengaged during deceleration, a time required for the re-engaging of the clutch will cause an energy loss of the engine and result in a delay in the acceleration response of the vehicle from the deceleration state.

In order to increase the response of the re-engaging of the clutch, the use of an electromagnetic clutch such as an electromagnetic powder clutch which can vary the engaging torque according to an energizing current, may be considered. Specifically, full release of the clutch is not performed during acceleration, but a weak energizing current to allow some transfer of torque, and improve the response of the re-engaging of the clutch.

However, if the clutch is frequently put into this partially engaged state, it leads to wear of clutch components such as powder, and the life of the clutch will be shortened. Moreover, since energy is consumed within the clutch, the power generation amount of the motor/generator decreases, and the energy recovery efficiency declines.

It is therefore an object of this invention to increase the energy recovery efficiency during regenerative braking without affecting the acceleration response of the vehicle from the deceleration state.

In order to achieve the above object, this invention provides an electromagnetic clutch control device for use with such a vehicle that comprises a generator connected to a drive wheel, a battery electrically connected to the generator, a conversion circuit which converts a power generated by the generator into a power stored by the battery, an engine and an electromagnetic clutch which transmits an output torque of the engine to the drive wheel under an engaging force according to an energizing current. The control device comprises a sensor which detects an output rotation speed of the electromagnetic clutch, a sensor which detects that the vehicle is in a predetermined deceleration state, and a microprocessor programmed to supply the energizing current to the electromagnetic clutch, and increase the energizing current the lower the output rotation speed of the electromagnetic clutch, when the vehicle is in the predetermined deceleration state.

This invention also provides a method for controlling an electromagnetic clutch of such a vehicle that comprises a generator connected to a drive wheel, a battery electrically connected to the generator, a conversion circuit which converts a power generated by the generator into a power stored by the battery, and an engine connected to the drive wheel via the electromagnetic clutch. The electromagnetic clutch transmits an output torque of the engine to the drive wheel under an engaging force according to an energizing current. The control method comprises detecting an output rotation speed of the electromagnetic clutch, detecting that the vehicle is in a predetermined deceleration state; and increasing the energizing current supplied to the electromagnetic clutch the lower the output rotation speed of the electromagnetic clutch, when the vehicle is in the predetermined deceleration state.

The details as well as other features and advantages of this invention are set forth in the remainder of the specification and are shown in the accompanying drawings.

DESCRIPTION OF THE PREFERRED EMBODIMENTS

Figure 1:
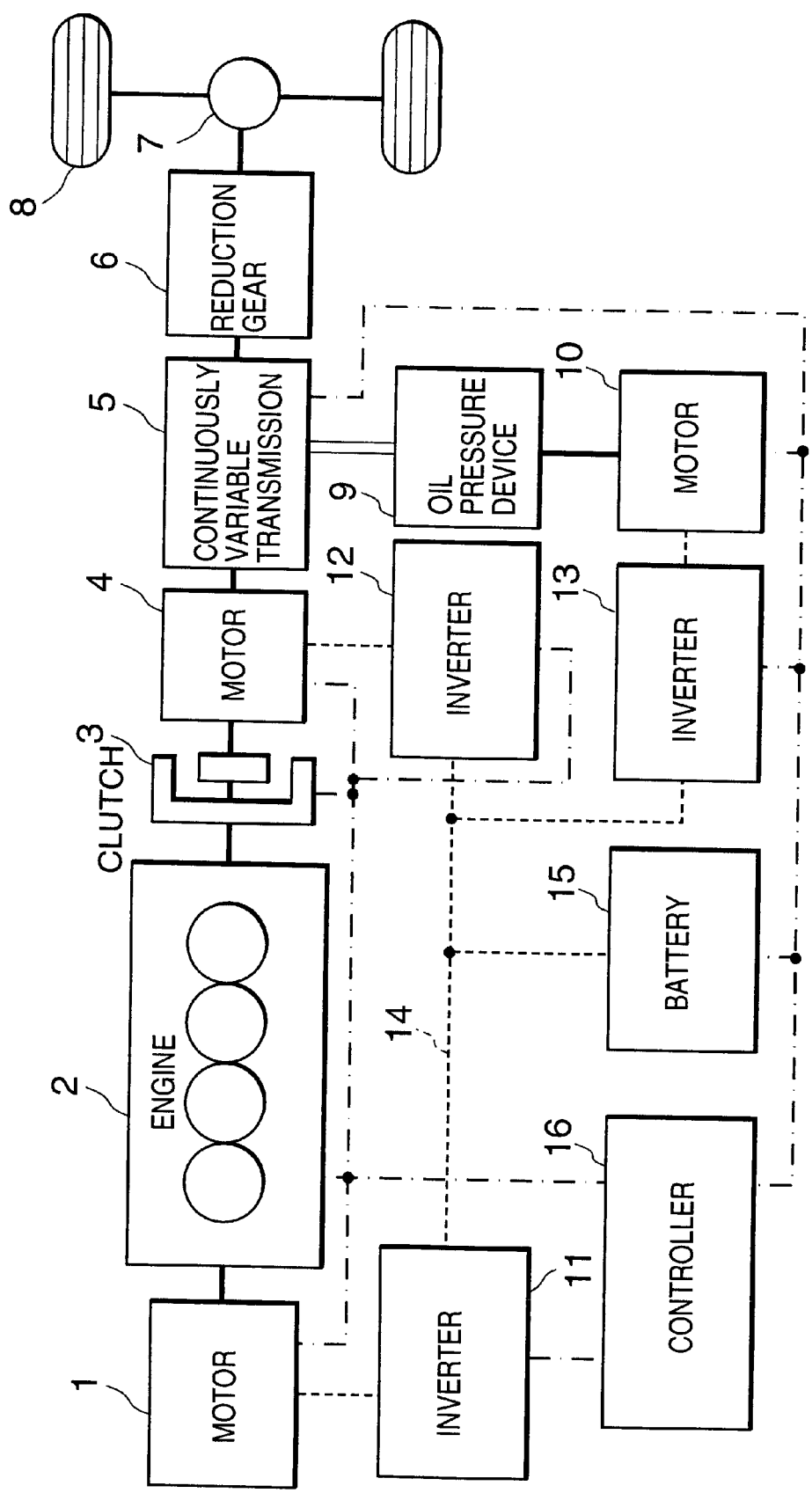
FIG. 1 is a schematic diagram of a hybrid vehicle to which this invention is applied.

Referring to FIG. 1 of the drawings, a parallel hybrid drive vehicle to which this invention is applied is provided with an engine 2 connected to a motor 4 via a clutch 3.

When the clutch 3 is released, the output of the motor 4 is transmitted to a drive wheels 8 via a continuously variable transmission 5, reduction gear 6, and differential gear 7. When the clutch 3 is engaged, the drive force of the engine 2 and the motor 4 is transmitted to the drive wheels 8. The clutch 3 comprises an electromagnetic powder clutch which can adjust the transmitted torque.

The continuously variable transmission 5 is a V-belt continuously variable transmission which transmits a drive force at an arbitrary speed ratio via a V-belt looped over a pair of pulleys. The speed ratio of the continuously variable transmission 5 is varied by an oil pressure supplied from an oil pressure device 9. The oil pressure device 9 is driven by a motor 10.

Another motor 1 is connected to the engine 2. The motor 1 is mainly used to start the engine 2, and for power generation. The motor 4 is mainly used to drive the drive wheels 8, and for regenerative power generation using the braking of the vehicle. Therefore, the motors 1 and 4 are motor/generators. On the other hand, the motor 10 is used to drive an oil pump with which an oil pressure device 9 is provided, and functions only as a motor. The motors 1, 4 and 10 are alternating current motors, and the motors 1, 4 and 10 are respectively controlled via inverters 11, 12 and 13.

It is also possible to use direct current motors for the motors 1, 4 and 10. In this case, the inverters are replaced by DC/DC converters.

In FIG. 1, the solid line shows the transmission path of mechanical force, the broken line shows the transmission path of electrical power, the dot-and-dash line shows the transmission path of a signal, and the double line shows the transmission path of oil pressure.

The inverters 11, 12 and 13 are connected to a DC link 14. A battery 15 is connected to the DC link 14.

The inverters 11, 12 and 13 comprise power transistors. They convert direct current from the battery 15 into alternating current by frequency control via the power transistors, and supply it to the motors 1, 4 and 10. Likewise, alternating current generated by the motors 1 and 4 is converted into direct current by the inverters 11 and 12, and charges the battery 15.

Hence, by directly interconnecting the inverters 11, 12 and 13 via the DC link 14, the current generated by the motor 1 or 4 may be directly provided to the other motors via the DC link without charging the battery 15.

The battery 15 may be a lithium ion battery, nickel hydrogen battery or a lead battery, or an electric double layer capacitor known as a power capacitor.

The engaging and disengaging of the clutch 3, and the torque transmitted by the clutch 3, are controlled by the controller 16. The rotation speeds and output torques of the motors 1, 4 and 10, speed ratio of the continuously variable transmission 5, fuel injection amount, injection timing and ignition timing of the engine 2 are also controlled by the controller 16.

The controller 16 is a microcomputer comprising a central processing unit (CPU), read-only memory (ROM), random access memory (RAM) and input/output interface (I/O interface).

Figure 2:
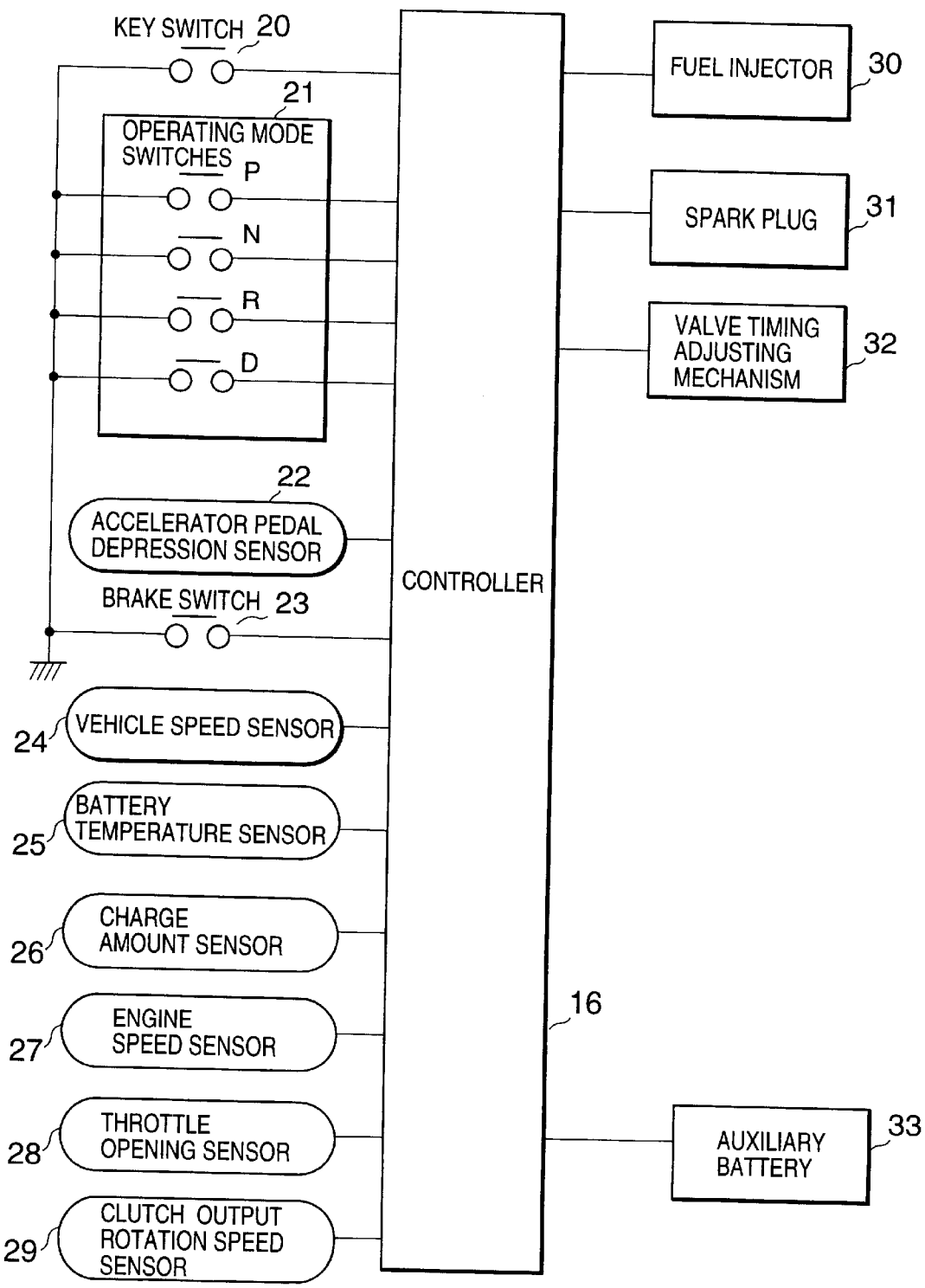
FIG. 2 is a schematic diagram of a clutch control device including a controller according to this invention.

A key switch 20, selector lever switch 21, accelerator depression sensor 22, brake switch 23, vehicle speed sensor 24, battery temperature sensor 25, battery SOC sensor 26, engine rotation speed sensor 27, throttle opening sensor 28 and clutch output rotation speed sensor 29 are connected to the controller 16 as shown in FIG. 2.

The key switch 20 outputs an ON signal when a vehicle ignition switch is in the ON or START position, otherwise it outputs an OFF signal.

The selector lever switch 21 comprise a group of switches which detect the operating position of a selector lever provided to the continuously variable transmission 5 to select one of the ranges parking P, neutral N, reverse R and drive D, and output a corresponding signal.

The accelerator depression switch 22 detects a depression degree APS of an accelerator pedal. The brake switch 23 outputs an ON signal when a brake pedal with which the vehicle is equipped is depressed, otherwise it outputs an OFF signal.

The battery temperature sensor 25 detects the temperature of the main battery 15. The battery SOC sensor 26 detects a SOC (State Of Charge) which is a representative value of the charge amount of the main battery 15.

The engine rotational speed sensor 27 detects the rotation speed Ne of the engine 2. The throttle opening sensor 28 detects the opening of a throttle with which the engine 2 is equipped. The clutch output rotation speed sensor 29 detects a rotation speed Nc of the output axis of the clutch 3. This rotation speed is equal to the rotation speed of the motor 4.

Based on the signals input from these sensors, the controller 16 outputs a signal to a fuel injector 30, spark plug 31, and valve timing adjusting device 32, and thereby controls the operation of the engine 2. The operation of the motors 1, 4 and 10 is also controlled by signals output from the controller 16 to the inverters 11, 12 and 13. Moreover, the speed ratio is controlled by a signal output from the controller 16 to an actuator of the continuously variable transmission 5, not shown.

Engaging and disengaging of the clutch 3 is also controlled by a signal output from the controller 16 to the clutch 3, and the transmitted torque is thereby controlled. The controller 16 operates with power supplied from an auxiliary low-voltage battery 33.

Figure 3:
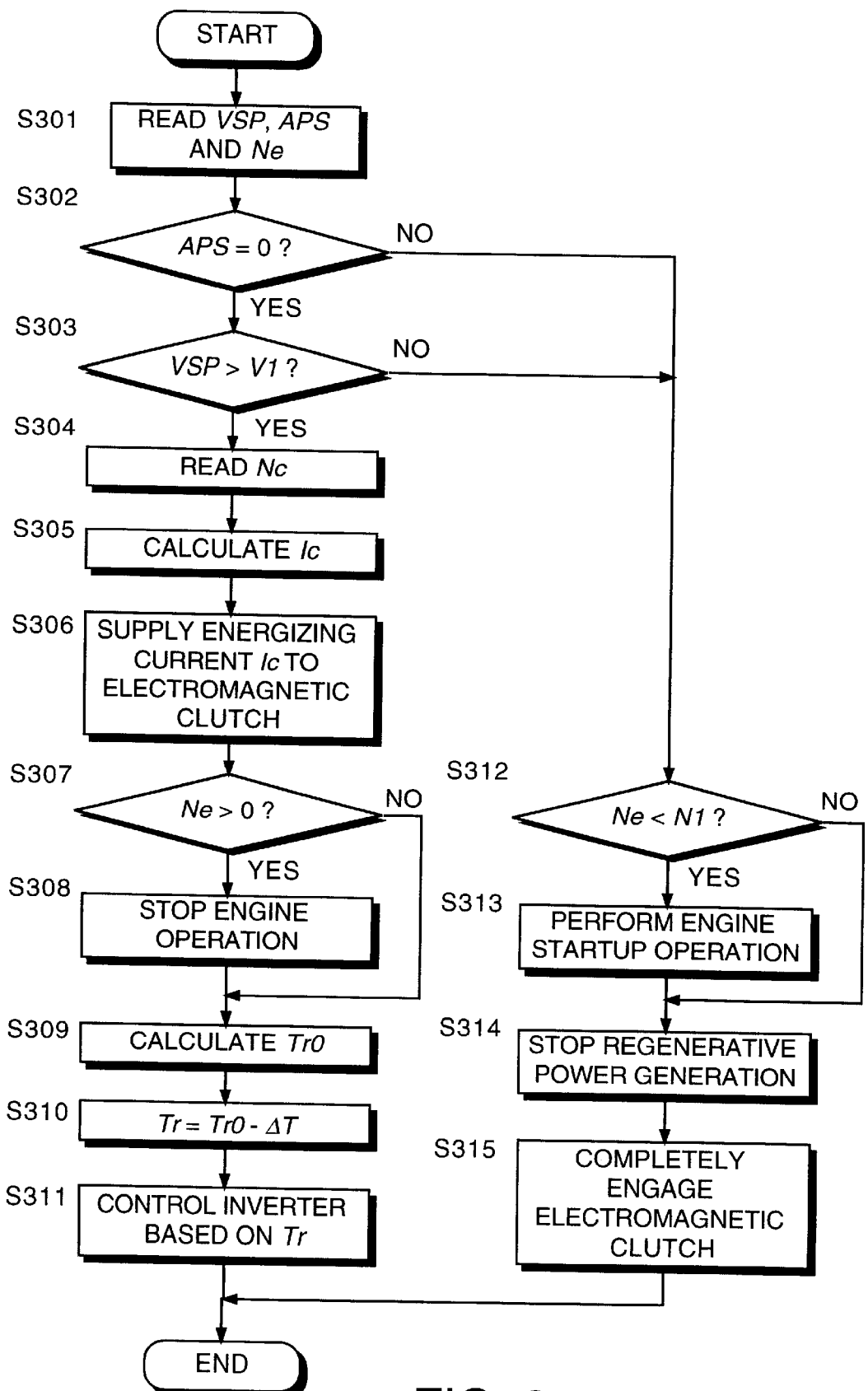
FIG. 3 is a flowchart for describing a control routine of a drive train comprising an electromagnetic clutch, performed by a controller according to this invention.

Next, the control routine for controlling the clutch 3 performed by the controller 16 will be described referring to the flowchart of FIG. 3. This routine is performed at an interval of, for example, 10 milliseconds.

First, a vehicle speed VSP, accelerator depression degree APS and engine rotation speed Ne are read in a step S301.

In a step S302, it Is determined whether or not the accelerator depression degree APS is 0, i.e., whether or not the accelerator pedal is depressed.

When the accelerator depression amount APS is 0, the routine proceeds to a step S303, and when the accelerator depression amount APS is not 0, the routine proceeds to a step S312.

In the step S303, it is determined whether or not the vehicle speed VSP exceeds a predetermined vehicle speed V1. When the vehicle speed VSP exceeds the predetermined vehicle speed V1, the routine performs the processing of steps S304–S311, and when the vehicle speed VSP does not exceed the predetermined vehicle speed V1, the routine performs the processing of steps S312–S315.

Here, the steps S304–S311 mean clutch control when the vehicle is decelerating, and the steps S312–S315 mean clutch control when the vehicle is not decelerating.

First, the clutch control during deceleration will be described.

In the step S304, the output rotation speed Nc of the clutch 3 detected by the clutch rotation output speed sensor 29 is read.

Figure 4:
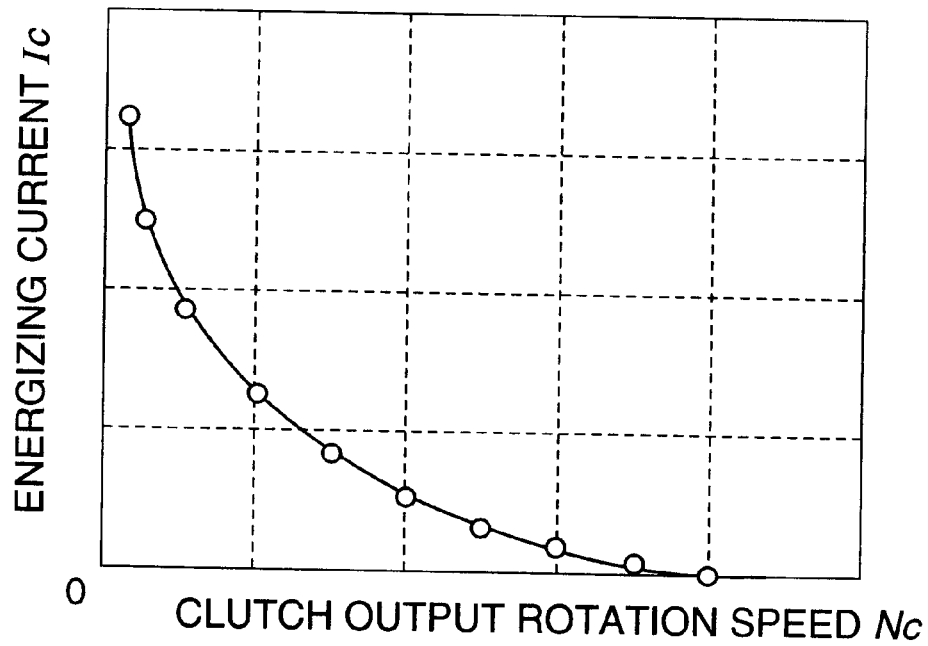
FIG. 4 is a diagram showing the contents of a map stored by the controller for determining an energizing current Ic of the electromagnetic clutch.

In a step S305, an energizing current value Ic of the clutch 3 is calculated based on the output rotation speed Nc of the clutch 3. For this calculation, a map specifying the relation of the output rotation speed Nc of the clutch 3 to the energizing current value Ic shown in FIG. 4 is prestored in the controller 16.

According to this map, the energizing current Ic is set to be larger the lower the output rotation speed Nc. This is due to the following reason.

Figure 6:
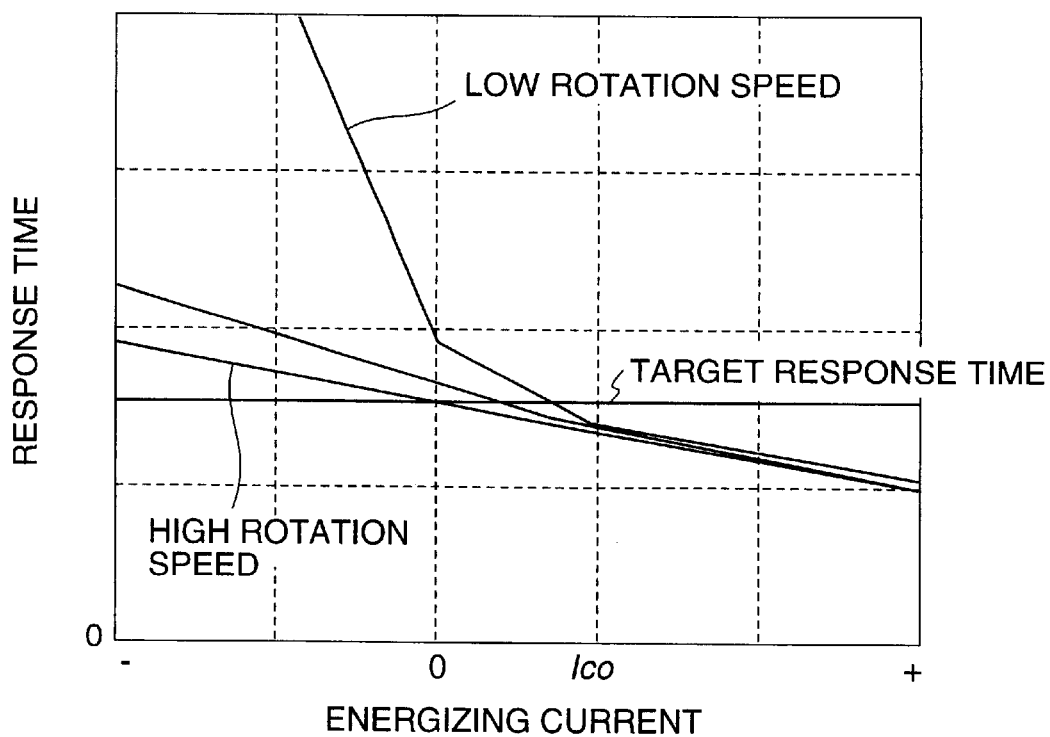
FIG. 6 is a diagram showing the relation between the energizing current and the response time of the electromagnetic clutch according to experiments performed by inventors.

FIG. 6 shows results which the inventors obtained by experiment concerning the relation of the output rotation speed of an electromagnetic powder clutch and the response time of the clutch until the clutch is completely engaged when the energizing current is supplied to the clutch in a partially engaged state.

In the range of the energizing current between zero and Ico, the response time is shorter the larger the energizing current. Also, for identical energizing current values, the response time is shorter the higher the output rotation speed of the clutch.

In the map of FIG. 4, the reason why the energizing current value Ic is increased the lower the output rotation speed Nc of the clutch 3 is that this shortens the response time from the partially engaged state to the completely engaged state when the output rotation speed Nc is low. As a result, the time required for the clutch 3 to change over from the partially engaged state to the completely engaged state is effectively constant regardless of the energizing current Ic.

In the next step S306, the energizing current value Ic obtained from the map of FIG. 4 is supplied to the clutch 3. In the step S307, it is determined whether or not the engine rotation speed Ne is larger than 0.

When the engine rotation speed Ne is larger than 0, after performing stop processing of the engine 2 in the step S308, the routine proceeds to the step S309.

When the engine rotation speed Ne is not larger than 0, the engine 2 is not operating, so the routine skips the step S308 and proceeds to the step S309.

In the steps S309 and S310, a target regeneration torque Tr of the motor 4 is set. The target regeneration torque Tr is represented as a parameter of the rotation speed of the motor 4. Here, the rotation speed of the motor 4 is equal to the output rotation speed Nc of the clutch 3.

The target regeneration torque Tr is set to be equivalent to the rotational resistance exerted by the engine 2 on the drive wheels 8 when the vehicle decelerates while the clutch 3 is engaged. It also represents a target input rotation torque of the motor 4 when it operates as a generator.

Figure 7:
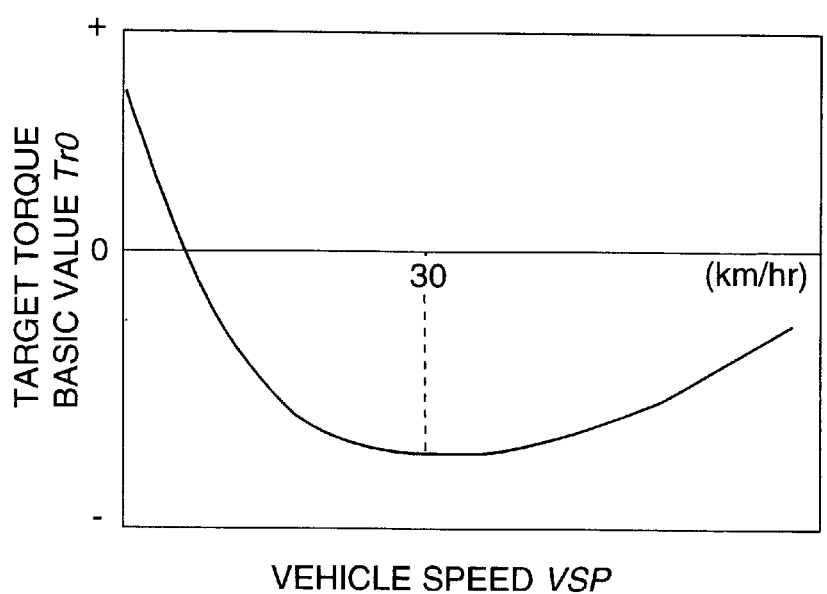
FIG. 7 is a diagram showing the contents of a map stored by the controller for determining a basic value Tr0 of target regeneration torque.

In the step S309, a basic value Tr0 of the target regeneration torque Tr is calculated by looking up a map prestored in the controller 16 based on the vehicle speed VSP. The contents of the map are shown in FIG. 7. In this map, the basic value Tr0 is set to be smaller the larger the vehicle speed VSP in a range where VSP is larger than 30 km/hr.

Since the clutch 3 is in a partially engaged state, the frictional resistance of the clutch 3 exerts a rotational resistance on the drive wheels 8.

Figure 5:
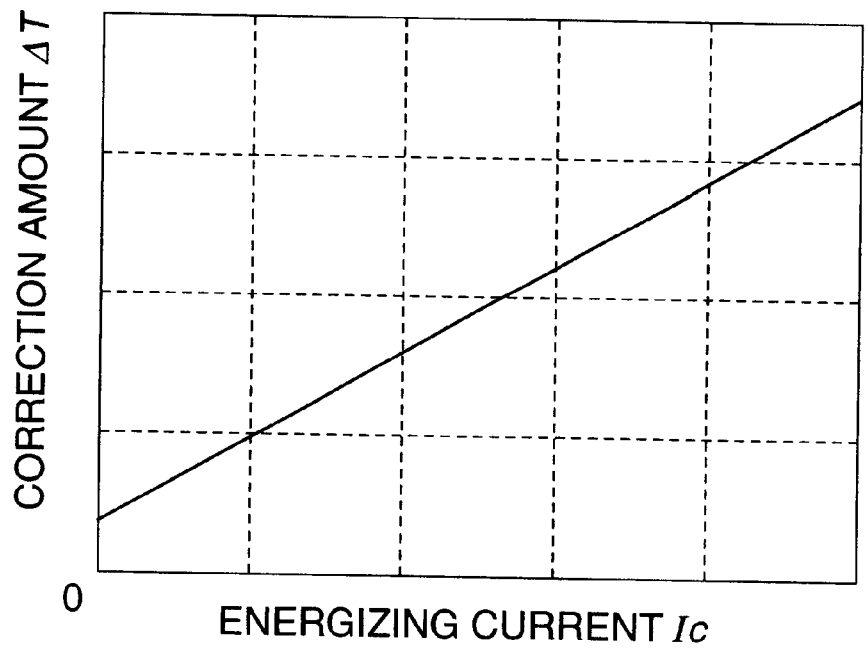
FIG. 5 is a diagram showing the contents of a map stored by the controller for determining a torque correction amount ΔT of the electromagnetic clutch.

Therefore, in the step S310, the target regeneration torque Tr is calculated by subtracting a correction amount $\Delta T$ equivalent to this rotational resistance from the basic value Tr0. The correction amount $\Delta T$ is calculated by looking up a map shown in FIG. 5 prestored in the controller 16.

The correction amount $\Delta T$ is made to increase the larger the frictional resistance of the clutch 3, and therefore, the correction amount $\Delta T$ is increased according to the increase of the energizing current Ic supplied to the clutch 3.

In the step S311, the inverter 12 is controlled so that the motor 4 generates a rotational resistance, i.e., a braking force, equivalent to the target regeneration torque Tr calculated in the step S310 in this way, and the routine is terminated.

The inverter 12 converts the alternating current sent from the motor 4 into direct current by frequency control, and charges the battery 15.

The control method of the inverter 12 so that the power generated by the motor 4 corresponds to the target regeneration torque Tr is known in the art.

On the other hand, when it is determined in the steps S303 that the vehicle speed VSP does not exceed the predetermined speed V1, the routine performs the processing of steps S312–S315.

According to this routine, the processing of the steps S312–S315 is performed when the accelerator pedal depression amount APS is not 0, or when the vehicle speed VSP does not exceed the predetermined speed V1.

The former case or the latter case may arise even when the vehicle is decelerating, but in these cases, the deceleration does not require as much rotational resistance as is obtained through regenerative braking, or the power that the motor 4 generates would be too small to utilize even if regenerative braking were performed.

Therefore, these cases are classified as non-deceleration cases for convenience.

In the step S312, it is determined whether or not the engine 2 has stopped by comparing the engine rotation speed Ne with the predetermined speed N1.

When the engine rotation speed Ne has not reached the predetermined speed N1, a start-up operation of the engine 2 is performed in a step S313, and the routine proceeds to a step S314. On the other hand, when the engine rotation speed Ne is equal to or greater than the predetermined speed N1, the routine skips the step S313 and proceeds to the step S314.

In the step S314, the regenerative power generation of the motor 4 is stopped by a signal output to the inverter 12. If regenerative power generation has already stopped, the idle state is maintained.

In the last step S315, the clutch 3 is completely engaged and the routine is terminated.

Due to the processing of the steps S311–S315, the output of the engine 2 is supplied as drive force for the drive wheels 8 via the engaged clutch 3.

By executing the above routine, when the output rotation speed Nc of the clutch 3 is high, efficient regenerative power generation is performed by decreasing the energizing current of the clutch 3.

On the other hand, when the output rotational speed Nc of the clutch 3 is low, the response time until the clutch 3 is completely re-engaged, is shortened by increasing the energizing current of the clutch 3.

Therefore, when the driver of the vehicle depresses the accelerator pedal and re-accelerates the vehicle while it is decelerating, the rotation torque of the motor 4 and engine 2 act on the drive wheels 8 with sufficiently good response, and the vehicle accelerates quickly.

The contents of Tokugan Hei 10-313361, with a filing date of Nov. 4, 1998 in Japan, are hereby incorporated by reference.

Although the invention has been described above by reference to certain embodiments of the invention is not limited to the embodiments described above. Modifications and variations of the embodiments described above will occur to those skilled in the art, in light of the above teachings.

The embodiments of this invention in which an exclusive property or priviledge is claimed are defined as follows.

What is claimed is:

1. An electromagnetic clutch control device for use with a vehicle, the vehicle comprising a generator connected to a drive wheel, a battery electrically connected to the generator, a conversion circuit which converts a power generated by the generator into a power stored by the battery, an engine and an electromagnetic clutch which transmits an output torque of the engine to the drive wheel under an engaging force according to an energizing current, the control device comprising:

a sensor which detects an output rotation speed of the electromagnetic clutch;

a sensor which detects that the vehicle is in a predetermined deceleration state; and a micro processor programmed to:
supply the energizing current to the electromagnetic clutch; and increase the energizing current the lower the output rotation speed of the electromagnetic clutch, when the vehicle is in the predetermined deceleration state; and wherein the conversion circuit has a function to vary a power generation resistance of said generator according to a command signal, and the microprocessor is further programmed to control the command signal so that the power generation resistance of the generator coincides with a predetermined target regeneration torque.

2. An electromagnetic clutch control device as defined in claim 1, wherein the control device further comprises a sensor which detects a vehicle speed, and the microprocessor is further programmed to calculate a basic value of the target regeneration torque based on the vehicle speed, set a correction amount equivalent to a frictional resistance of the electromagnetic clutch in a partially engaged state, and calculate the target regeneration torque by subtracting the correction amount from the target regeneration torque basic value.

3. An electromagnetic clutch control device as defined in claim 2, wherein the target regeneration torque basic value is set to be smaller the higher the vehicle speed in a speed range higher than 30 km/hr.

4. An electromagnetic clutch control device as defined in claim 2, wherein the correction amount is set to be larger the larger the energizing current.

5. An electromagnetic clutch control device for use with a vehicle, the vehicle comprising a generator connected to a drive wheel, a battery electrically connected to the generator, a conversion circuit which converts a power generated by the generator into a power stored by the battery, an engine and an electromagnetic clutch which transmits an output torque of the engine to the drive wheel under an engaging force according to an energizing current, the control device comprising:

a sensor which detects an output rotation speed of the electromagnetic clutch;

a sensor which detects that the vehicle is in a predetermined deceleration state; and a micro processor programmed to:
supply the energizing current to the electromagnetic clutch; and increase the energizing current the lower the output rotation speed of the electromagnetic clutch, when the vehicle is in the predetermined deceleration state; and wherein the microprocessor is further programmed to stop an operation of the engine in the predetermined deceleration state, and start the engine and engage the electromagnetic clutch when an acceleration operation of the vehicle is performed in the predetermined deceleration state.

6. An electromagnetic clutch control device for use with a vehicle, the vehicle comprising a generator connected to a drive wheel, a battery electrically connected to the generator, a conversion circuit which converts a power generated by the generator into a power stored by the battery, an engine and an electromagnetic clutch which transmits an output torque of the engine to the drive wheel under an engaging force according to an energizing current, the control device comprising:

a sensor which detects an output rotation speed of the electromagnetic clutch;

a sensor which detects that the vehicle is in a predetermined deceleration state; and a micro processor programmed to:
supply the energizing current to the electromagnetic clutch; and increase the energizing current the lower the output rotation speed of the electromagnetic clutch, when the vehicle is in the predetermined deceleration state; and wherein the sensor which detects that the vehicle is in the predetermined deceleration state comprises a sensor which detects an accelerator depression degree of the vehicle, and a sensor which detects a vehicle speed, and said microprocessor is further programmed to determine that the vehicle is in the predetermined deceleration state when the accelerator depression degree is zero while the vehicle speed is not less than a predetermined speed.

* * * * *